(12) United States Patent
Zajac

(10) Patent No.: US 11,472,349 B2
(45) Date of Patent: Oct. 18, 2022

(54) EXTERNAL SENSOR ASSEMBLY FOR VEHICLES

(71) Applicant: UATC, LLC, San Francisco, CA (US)

(72) Inventor: Brian Zajac, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 615 days.

(21) Appl. No.: 16/504,049

(22) Filed: Jul. 5, 2019

(65) Prior Publication Data

US 2019/0359147 A1 Nov. 28, 2019

Related U.S. Application Data

(63) Continuation of application No. 15/136,876, filed on Apr. 22, 2016, now Pat. No. 10,343,620.

(51) Int. Cl.
| | |
|---|---|
| *B60R 11/04* | (2006.01) |
| *G01C 3/08* | (2006.01) |
| *G01V 8/20* | (2006.01) |
| *B60R 11/00* | (2006.01) |

(52) U.S. Cl.
CPC ............. *B60R 11/04* (2013.01); *G01C 3/08* (2013.01); *G01V 8/20* (2013.01); *B60R 2011/004* (2013.01); *G05D 2201/0213* (2013.01)

(58) Field of Classification Search
CPC ..... B60R 11/04; B60R 2011/004; G01C 3/08; G01V 8/20; G05D 2201/0213
See application file for complete search history.

(56) References Cited

U.S. PATENT DOCUMENTS

| | | |
|---|---|---|
| D432,930 S | 10/2000 | Sanoner |
| D492,607 S | 7/2004 | Curkovic |
| D546,352 S | 7/2007 | Tsou |
| D590,762 S | 4/2009 | Gruner |
| D636,326 S | 4/2011 | Robertson |
| 8,108,147 B1 | 1/2012 | Blackburn |
| D717,228 S | 11/2014 | Sagen |
| D717,719 S | 11/2014 | Sagen |
| D724,520 S | 3/2015 | Gruner |
| D726,638 S | 4/2015 | Rupp |
| 9,037,852 B2 | 5/2015 | Pinkus |
| D746,217 S | 12/2015 | Gruner |
| D774,442 S | 12/2016 | Adler |

(Continued)

FOREIGN PATENT DOCUMENTS

CA 2903298 3/2017

*Primary Examiner* — Luke D Ratcliffe

(74) *Attorney, Agent, or Firm* — Dority & Manning, P.A.

(57) ABSTRACT

A sensor assembly may include a housing and a collection of optical sensors. The housing may include a base portion, and a raised portion defining a summit of the housing. A collection of optical sensors may include a first set of forward-facing optical sensors individually aligned with a corresponding opening in a front segment of the base portion for the housing, a second set of rear-facing optical sensors individually aligned with a corresponding opening in a rear segment of the base portion for the housing, and multiple sets of lateral optical sensors. Each set of lateral optical sensors may be aligned with a corresponding opening in one of multiple lateral segments of the base portion of the housing. Additionally, at least a first long distance sensor may be mounted on the summit.

20 Claims, 7 Drawing Sheets

(56) References Cited

U.S. PATENT DOCUMENTS

| | | |
|---|---|---|
| D785,771 S | 5/2017 | Bergin |
| 2007/0154068 A1 | 7/2007 | Stein |
| 2011/0182475 A1* | 7/2011 | Fairfield ............ G08G 1/09623 |
| | | 382/104 |
| 2013/0321627 A1* | 12/2013 | Turn, Jr. ............... B60W 30/00 |
| | | 348/148 |
| 2015/0379766 A1* | 12/2015 | Newman ................. G06T 7/246 |
| | | 356/5.01 |
| 2016/0214534 A1* | 7/2016 | Richards ................ H04N 5/332 |
| 2016/0282468 A1* | 9/2016 | Gruver .................. G01S 7/4813 |
| 2017/0259753 A1* | 9/2017 | Meyhofer ............ H04N 13/204 |
| 2017/0305360 A1 | 10/2017 | Zajac |

* cited by examiner

EXTERNAL SENSOR ASSEMBLY FOR VEHICLES

PRIORITY CLAIM

The present application is a continuation of U.S. application Ser. No. 15/136,876 having a filing date of Apr. 22, 2016. Applicant claims priority to and the benefit of each of such applications and incorporate all such applications herein by reference in its entirety.

TECHNICAL FIELD

Examples relate to an external sensor assembly for vehicles.

BACKGROUND

Autonomous vehicles refer to vehicles which replace human drivers with sensors and computer-implemented intelligence, and other automation technology. Under existing technology, autonomous vehicles can readily handle driving with other vehicles on roadways such as highways. However, urban settings can pose challenges to autonomous vehicles, in part because crowded conditions can cause errors in interpretation of sensor information.

DETAILED DESCRIPTION

Figure 1A:
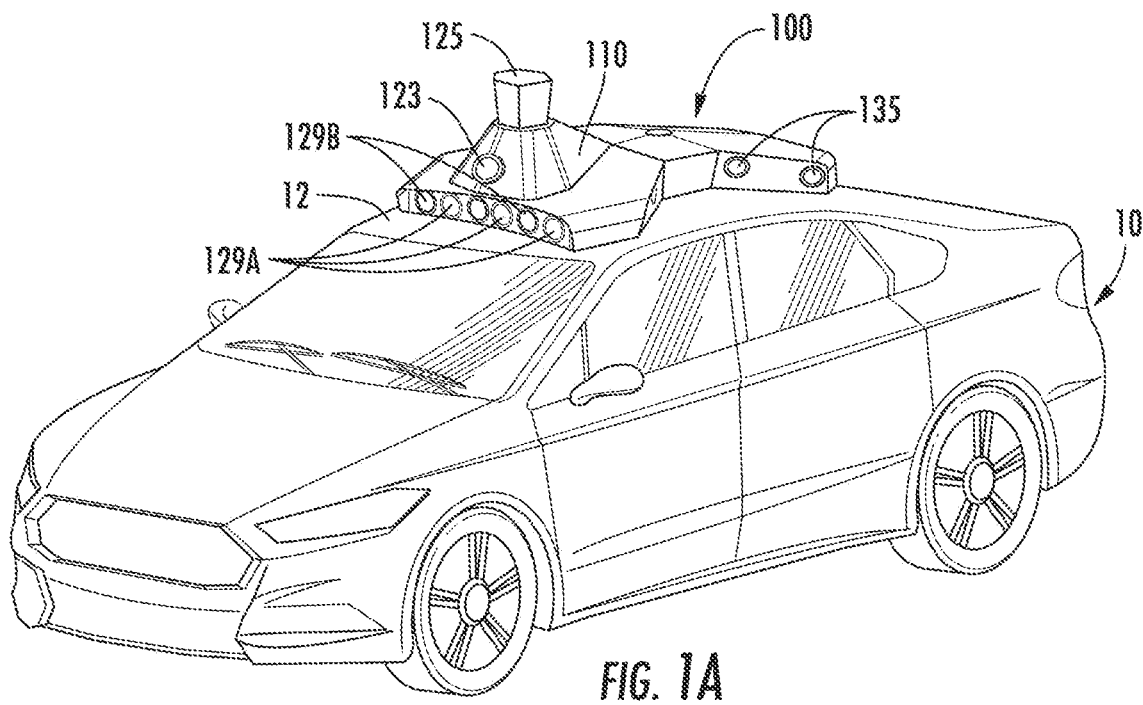
FIG. 1A is a front isometric view of an external sensor assembly for use with an autonomous vehicle, according to one or more examples.

Examples relate to an external sensor assembly for vehicles. In particular, examples include an external sensor assembly for use with an autonomous vehicle. Still further, an external sensor assembly such as described with various examples may be used with hybrid vehicles, which can enable various degrees of autonomous driving.

In some examples, a sensor assembly includes a housing that can be mounted to a vehicle in order to enable autonomous driving. Among other benefits, the sensor assembly can retrofit onto existing vehicles to enable such vehicles to have autonomous driving and/or enhanced sensing capabilities.

In some examples, the sensor assembly is modular, so that it can be placed or mounted onto a vehicle as a unit. In some examples, the components of the sensor assembly are operatively interconnected within a housing, so that the sensor assembly can be made operational with power and external connectivity to a control system of the vehicle.

Some examples include a sensor assembly for a vehicle. The sensor assembly may include a housing and a collection of optical sensors. The housing may include a base portion, and a raised portion defining a summit of the housing, wherein the housing is mounted to an exterior of the vehicle. A collection of optical sensors may include a first set of forward-facing optical sensors, a second set of rear-facing optical sensors, and multiple sets of lateral optical sensors. The first set of forward-facing optical sensors can be individually aligned with a corresponding opening in a front segment of the base portion for the housing. The second set of rear-facing optical sensors may be individually aligned with a corresponding opening in a rear segment of the base portion for the housing. Each set of lateral optical sensors may be aligned with a corresponding opening in one of multiple lateral segments of the base portion of the housing. Additionally, at least a first long distance sensor may be mounted on the summit.

According to other examples, a housing is provided for a sensor assembly of a vehicle. The housing includes a base portion and a raised portion defining a summit of the housing. The housing may also include a first set of openings provided on a forward-facing segment of the base portion, with the first set of openings being dimensioned and positioned on the base portion to align with a first set of forward-facing optical sensors. Additionally, the housing may include a second set of openings provided on a rear-facing segment of the base portion, and the second set of openings may be dimensioned and positioned on the base portion to align with a second set of rear-facing optical sensors. Still further, the housing may include multiple sets of lateral openings, and each of the openings of the multiple sets may be dimensioned and positioned on the base portion to align with a corresponding lateral-facing sensor.

Numerous examples are referenced herein in context of an autonomous vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle behaves given challenging surroundings of the vehicle environment.

Figure 1B:
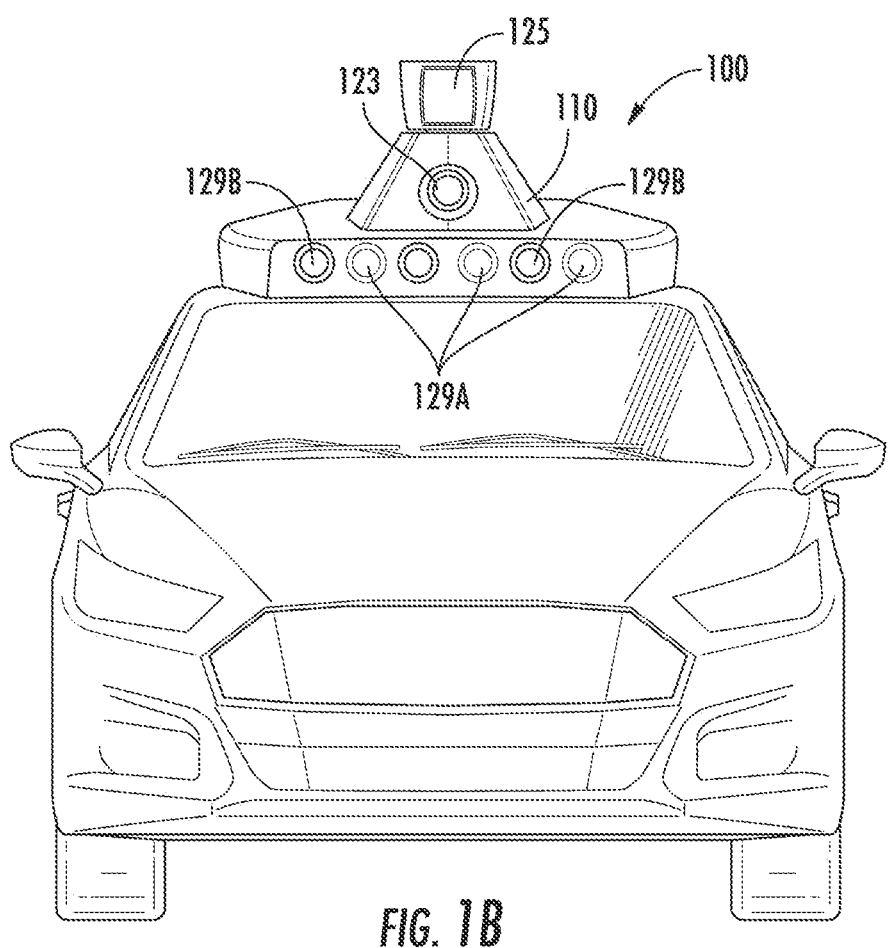
FIG. 1B is a side view of the external sensor assembly of FIG. 1A.
Figure 1C:
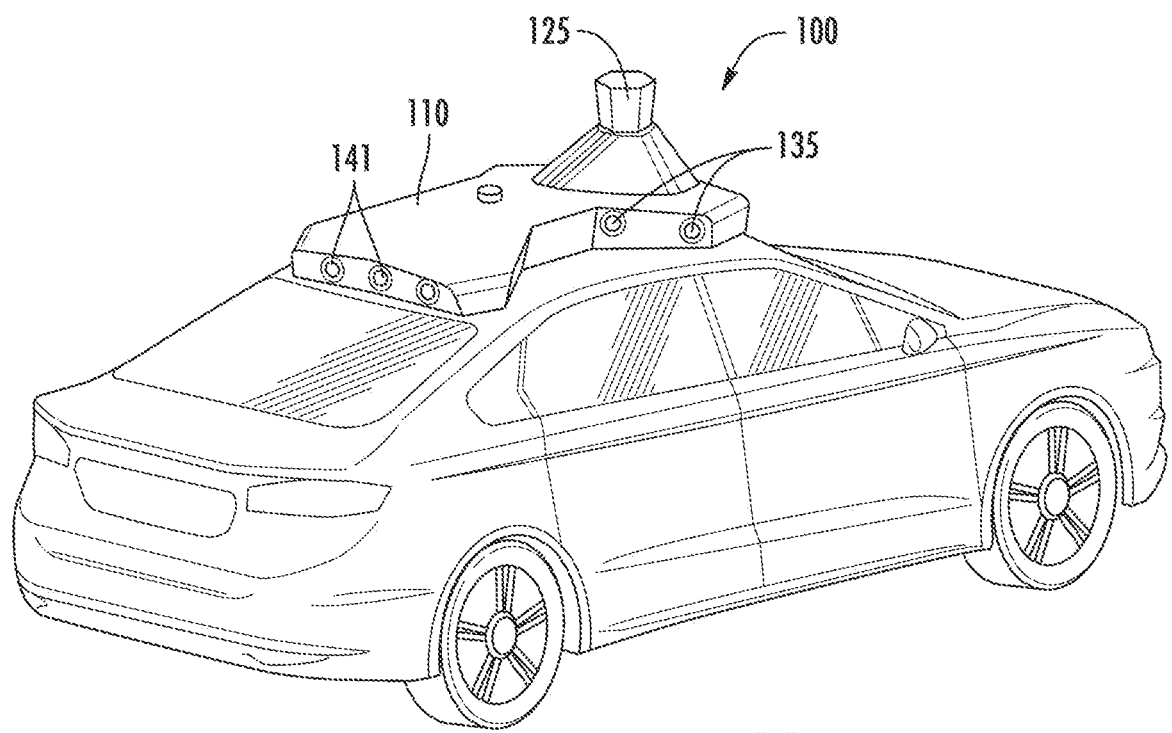
FIG. 1C is a rear isometric view of the external sensor assembly of FIG. 1A.

FIG. 1A through FIG. 1C illustrate an example sensor assembly for use with a vehicle. In an example shown, the 100 is mounted to a roof 12 of a vehicle 10. The vehicle 10 may be autonomous, such as self-driving. In variations, the vehicle 10 may be a hybrid or autonomously enabled vehicle. As described with various examples, the 100 may be modular so that it can be mounted as a retrofit on a vehicle manufactured by a third-party.

According to some examples, the 100 includes an 110 that is shaped to enable positioning of various types of sensors, in a manner that promotes optimal use of such sensors. In an example shown, a front end of the 100 includes multiple forward-facing optical sensors, such as three long range stereoscopic cameras 129A and a pair of alternative stereoscopic cameras 129B that is part of a larger set for providing 360 degree surround stereo vision. A rotatable long-range sensor 125 is mounted at a summit 118 of the housing 110. Additionally, a traffic camera 123 can be provided at a raised and angled wall 111 of the housing 110.

Figure 2A:
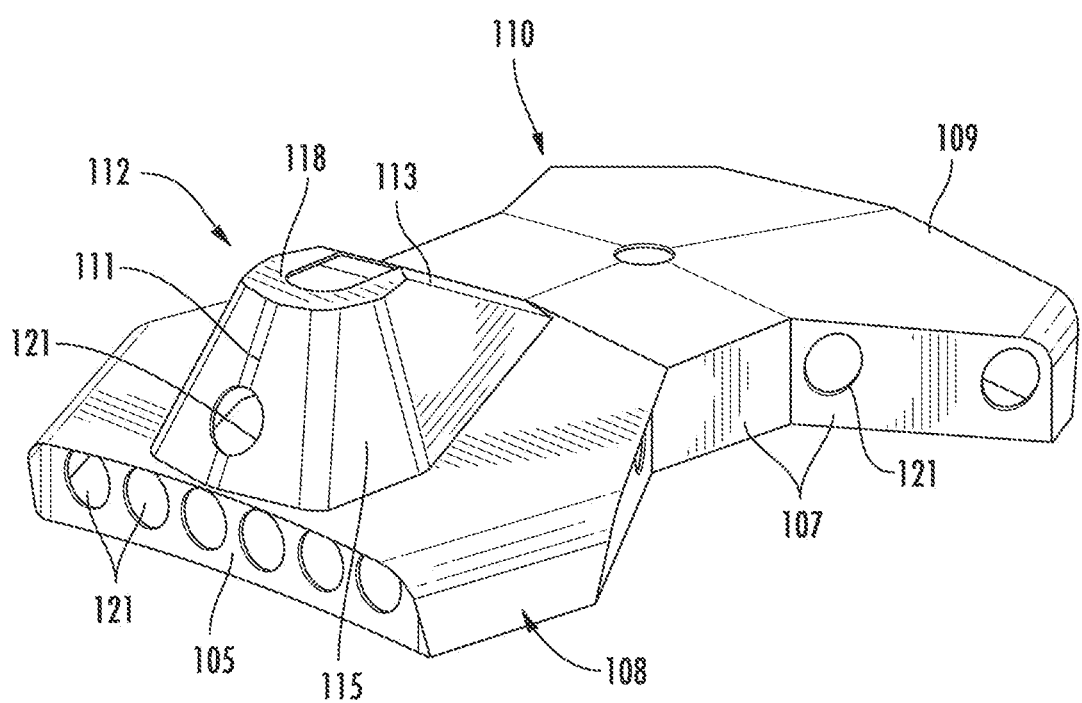
FIG. 2A illustrates an example housing for an external sensor assembly such as shown with FIG. 1A through FIG. 1C.
Figure 2B:
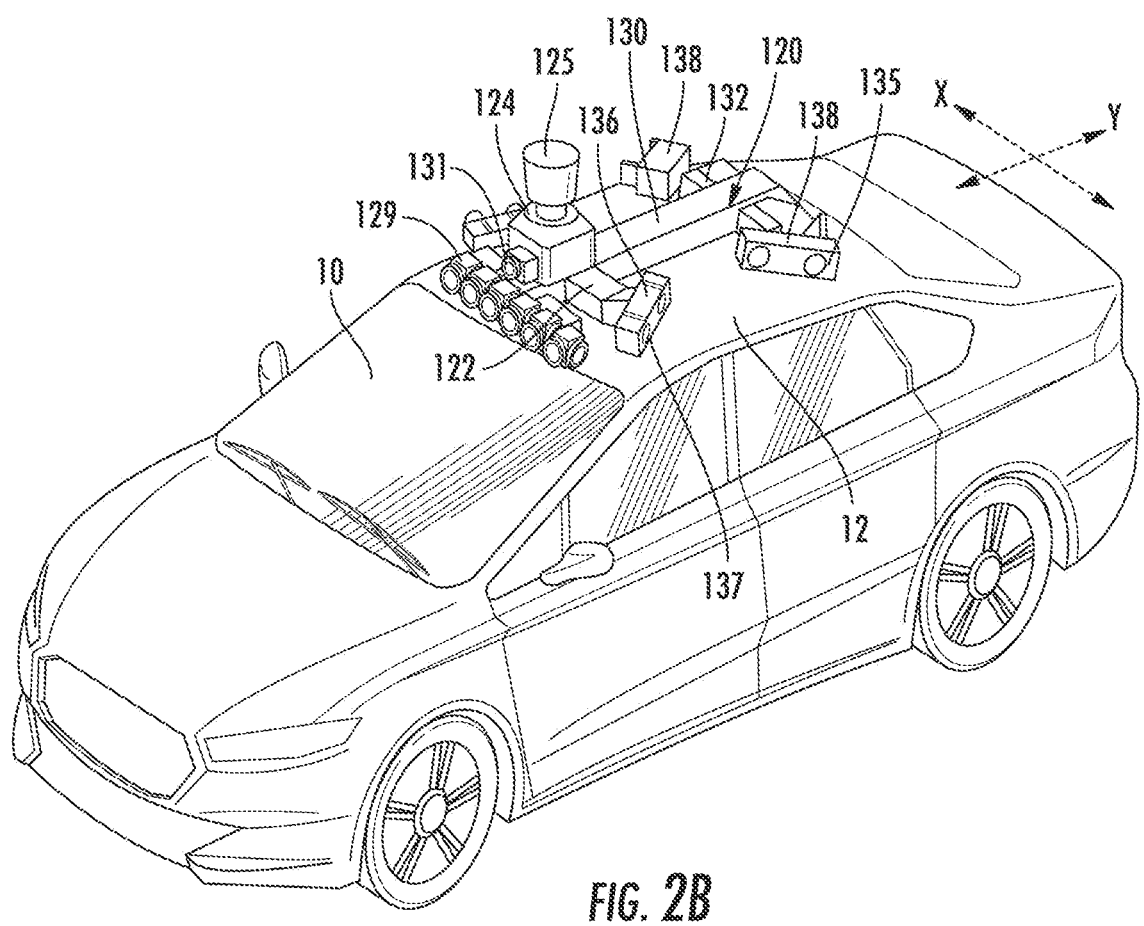
FIG. 2B illustrates an example layout for sensor components of an external sensor assembly such as shown with FIG. 1A through FIG. 1C.

With further reference to FIG. 1A, a lateral side of the 100 may include lateral segments 105 which are acutely angled with respect to a Y-axis (coinciding with direction of vehicle travel as shown by FIG. 2B). The lateral segments 105 may be directed inward relative to each other to create overlapping sensing regions. In variations, the lateral segments 105 may be directed outward to expand sensor areas. FIG. 2A illustrates an example housing for a sensor assembly of a vehicle.

According to some examples, an assembly housing 110 of an external sensor assembly 100 (see FIGS. 4 and 5) is formed from a single-body or unitary construction to retain a collection of sensors that are positioned, through direct or indirect affixture with the housing, to collect input for a control system of an autonomous vehicle. The assembly housing 110 can be dimensioned and shaped to be mounted to a top of a vehicle roof 12 without any portion of the housing extending over or beyond the perimeter of the vehicle's roof.

In one variation, the assembly housing 110 can include an open bottom construction, such that the roof 12 encloses a space that is partially defined by the housing. In variations, the assembly housing 110 is self-enclosed, so as to include a bottom surface. In such examples, the assembly housing 110 is modular, so as to be assembled to retain sensor components, and to mount to the roof 12 of the vehicle 10 (see FIG. 4 and FIG. 5) with the sensor components being operationally interconnected.

According to some examples, the assembly housing 110 is shaped to retain sensors for the autonomous vehicle in an orientation and relative position that optimizes the view available to selective and specialized sensors that are utilized by the autonomous vehicle. In an example of FIG. 1, the assembly housing 110 includes a multi-level construction. In particular, the assembly housing 110 includes a housing body portion 108 and a raised housing portion 112. The housing body portion 108 includes at least (i) a front segment 105, (ii) one or more lateral segments 107 on each lateral side of the assembly housing 110, and (iii) a rear-facing segment 109. Each of the forward-facing lateral segment 105, one or more lateral segments 107, and rear-facing segments 109 can include openings 121, retention structures, holding regions, and/or other structural facets for holding a sensor component in a desired orientation. The raised housing portion 112 can include front and rear walls 111, 113 respectively, as well as sidewalls 115 on respective lateral sides of the raised housing portion 112. The raised housing portion 112 can provide a summit 118 or peak segment to retain, for example, a rotatable sensor. In some examples, the assembly housing 110 can also include one or more coupling mechanisms to couple the sensor assembly to the exterior of the vehicle (e.g., screws, bolts, latches, interconnecting grooves, etc.).

According to some examples, the assembly housing 110 can also include a set of air vents/openings and/or grills to enable the flow of air into and/or out of the interior of the assembly housing 110. The sensor assembly 100 can include a plurality of sensor components and other electrical components (e.g., circuit boards, cables, wires, etc.) that generate heat as a result of operation or usage. Because the assembly housing 110 can provide an enclosure to house and protect the sensor and electrical components, the interior of the assembly housing 110 can become very hot. The set of vents can enable airflow and circulation of air from inside the sensor assembly 100 to the outside of the sensor assembly 110 and vice versa. In one example, the sensor assembly 110 can include one or more heat sinks and/or one or more fans that can facilitate the movement of air. The fan(s) can be positioned to move air in and out of the openings. Depending on implementation, for example, one or more vents can be positioned at the front segment 105, the lateral segments(s) 107, and/or the rear-facing segment 109 (e.g., between the one or more openings 121 or above or below the one or more openings 121). As an addition or a variation, one or more vents and/or grills can be positioned on the raised housing portion 112, such as on the front wall 111, the rear wall 113, and/or the lateral walls (see e.g., the vents to the right and left of the camera on the front wall 111 of the raised housing portion 112 of FIG. 4, or the vent and/or the grill on the rear wall 113 of the raised housing portion 112 of FIG. 5). In such examples, the raised housing portion 112 can include one or more fans to draw air into the raised housing portion 112 and/or to push air out of the raised housing portion 112.

FIG. 2B illustrates an example layout for sensor components of the external sensor assembly. In an example of FIG. 2, the assembly housing 110 is shown to be removed from the sensor assembly 100, so as to expose the layout of an interior of the sensor assembly 100. Within the assembly housing 110 (not shown in FIG. 2 for explanatory purposes), an interior body 120 extends in a lengthwise direction Y of the vehicle 10 (coinciding to a direction of travel for the vehicle). The interior body 120 may include multiple structures which are aligned or oriented to retain a respective sensor component in alignment with a corresponding opening of the assembly housing 110. The sensor assembly 100 may retain any one of multiple kinds of sensor components, such as, for example, optical sensors (short and/or long range lenses, fish-eye lenses), radars, global positioning system (GPS) components, and/or sonars.

The interior body 120 includes one or more trunks which extend in the Y direction. In one example, the interior body 120 includes a front trunk 122 on which a collection of optical sensors 129 are mounted. A vertical section 124 may extend from the front trunk 122 so as to be housed within the raised housing portion 112. The vertical section 124 can retain one or multiple sensor components 131 (e.g., traffic camera) about the front and rear walls 111, 113, as well as sidewalls 115 of the raised portion 112 of housing 110 (see FIG. 1). A rotatable sensor 125 (e.g., a long-range sensor) may be mounted to the vertical section 124 and/or summit 118 (see FIG. 1). The interior body 120 can include an extension 130 for a rear trunk 132. The rear trunk 132 can retain multiple sensors in alignment with openings 121 of the rear segment 109. The interior body 120, the trunks 122, 132, and/or the extensions 130 can also provide a channel to house a set of cables or wires for coupling the sensors with a set of electronic components (e.g., physical interfaces, circuit boards, ports, etc.).

In some examples, each of the front and rear trunk 122, 132 can include branch extensions 136, 138 respectively which extend acutely from the respective front and rear trunks 122, 132. Each branch extension 136, 138 can include one or more sensor components 135, 137, which are affixed and aligned to openings 121 of the corresponding lateral segments 107 (see FIG. 1). In an example shown, the geometry of the lateral segments 107 and branch extensions 136, 138 result in the sensor components being acutely aligned with the respective X and Y axes. The acute alignments provided by such geometry enable for use of specific sensors which can overlap in sensor view and provide better sensing for specific events and objects (e.g., humans next to vehicle).

Figure 3:
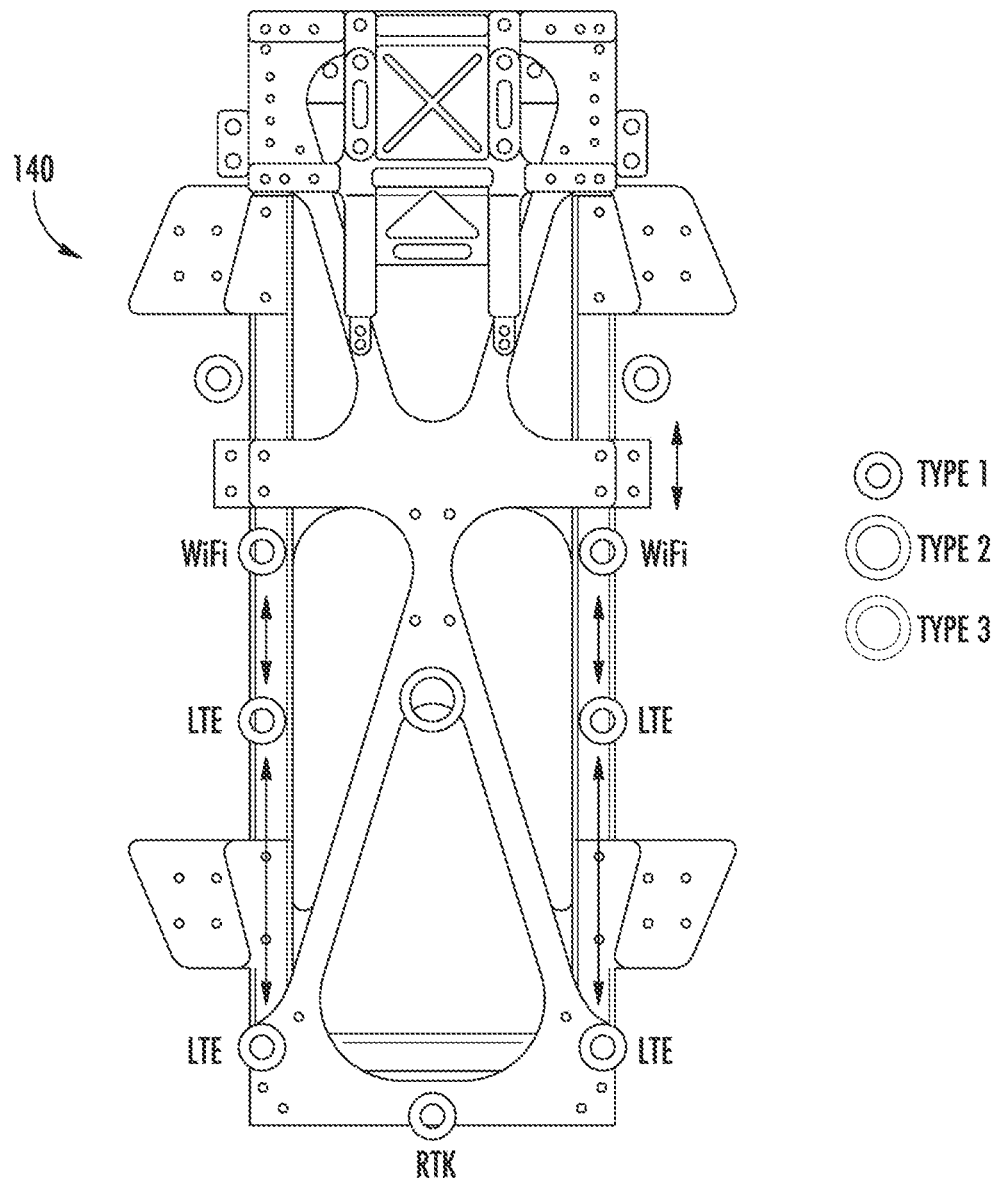
FIG. 3 illustrates an antenna structure for use with an external sensor assembly of a vehicle, according to one or more examples.

FIG. 3 illustrates an antenna structure 140 for use with a sensor assembly 100, according to one or more examples. The antenna structure 140 can include multiple distinct antennas which are integrated to provide wireless transceiver capabilities for different types of wireless devices (e.g., GPS, cellular transceiver, Wi-Fi and Bluetooth transceiver, shown as "Type 1" etc.). According to some examples, the antenna structure is integrated with an exterior shell of the housing 110.

Figure 4:
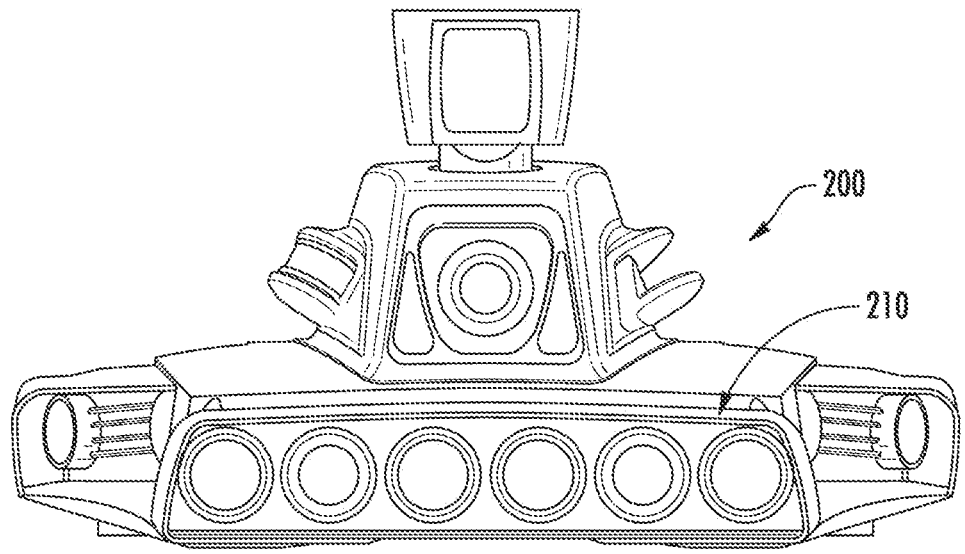
FIG. 4 illustrates a front view of an assembled external sensor assembly of a vehicle, according to a variation.
Figure 5:
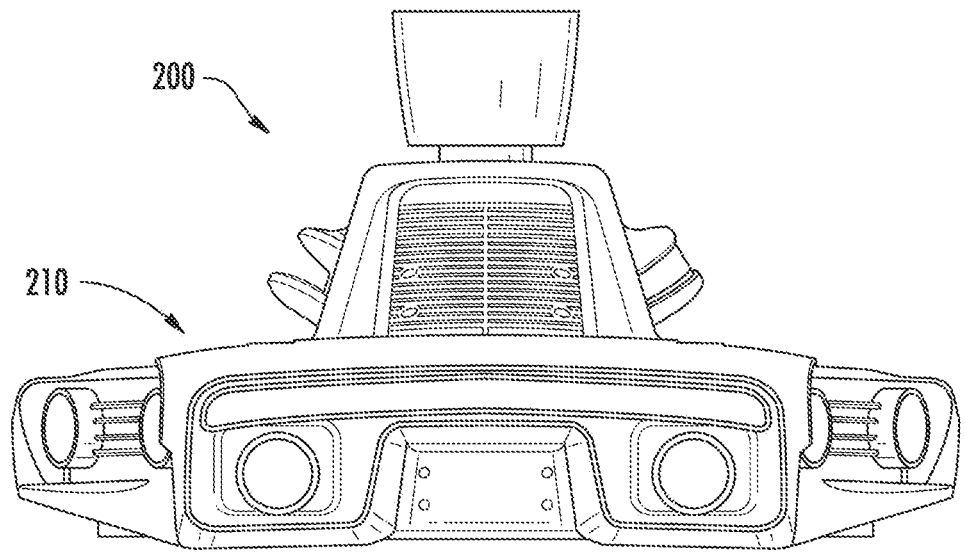
FIG. 5 illustrates a rear view of an assembled external sensor assembly of a vehicle, according to a variation

FIG. 4 and FIG. 5 illustrate a respective front and rear view of an assembled sensor assembly, according to a variation. In FIG. 4, a sensor assembly sensor assembly 200 can be constructed in similar fashion to an external sensor assembly such as shown by examples of FIG. 1 through FIG. 3. Accordingly, the sensor assembly 200 may be described with reference to numerals that represent elements and features of the sensor assembly 100. According to some examples, the sensor assembly 200 can include an assembly housing 210 that is formed from a single-body or unitary construction. The assembly housing 210 can be dimensioned and shaped for a corresponding type of vehicle so that no portion of the housing extends beyond a footprint of the roof of the vehicle. The assembly housing 210 may also be self-enclosed and modular, so as to be assembled to retain sensor components, and to mount to the roof 12 of the vehicle 10 with the sensor components being operationally interconnected. The sensor assembly 200 may differ from the sensor assembly 100 by, for example, shape and contour of the respective housing assembly housing 210 110.

According to some examples, the sensor components of the sensor assembly 100, 200 include (i) a set of long range cameras, provided by two or three cameras which are affixed to the interior body 120 (see FIG. 2) and aligned with corresponding openings 121 (see FIG. 1) of the front segment 105 of the housing assembly housing 110; (ii) multiple pairs of stereoscopic cameras, which collectively provide 360 stereo vision about the vehicle; (iii) one or more traffic cameras; (iv) one or more mapping cameras; and/or (v) a Lidar, provided as a rotatable long-distance sensor. In one implementation, the set of long-range cameras and one pair of the stereoscopic cameras are connected to the interior body 120 so as to be aligned with openings 121 of the front segment 105 of the body portion of the assembly housing 110. Still further, in some examples, a designated traffic camera is positioned on the front wall 111 of the raised housing portion 112. In some examples, the traffic camera is implemented as a camera that is optimized to detect traffic lights. Additionally, the front wall 111 of the raised housing portion 112 may be angled with respect to a vertical reference (e.g., 10 or more degrees) so that the camera detects traffic lights from a distance. The traffic camera can also include filters and/or local logic to promote traffic light detection. Still further, the Lidar may be mounted or constructed to rotate on the summit 118 (see FIG. 1) of the assembly housing 110. Still further, in some variations, the summit 118 can include an accelerometer and/or gyroscope in order to enable controlled dampeners, which may also be combined with the summit 118, to detect and adjust for vibrations.

Figure 6:
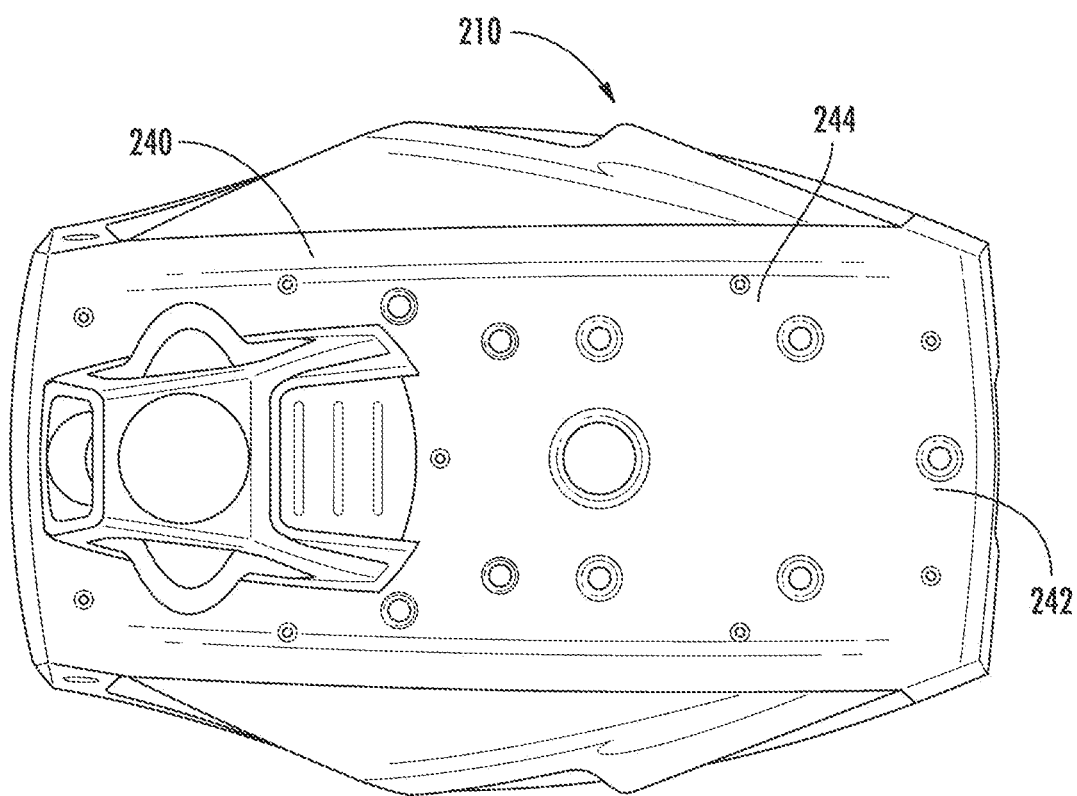
FIG. 6 illustrates a top view of an external sensor assembly of a vehicle, according a variation.

FIG. 6 illustrates a top view of the housing, according to some examples. A top surface 242 of the housing 210 can be integrated with the antenna structure 140 (see FIG. 3). In variations, the antenna structure 140 may be mounted underneath the top surface 242 of the housing, such as to be connected to the interior body 120 (see FIG. 2). The top surface 242 of the housing 210 can include multiple surface features 244 for enabling use of specific antennas (e.g., GPS, cellular) which may be integrated into the antenna structure 140.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is being claimed is:

1. An external sensor assembly for a vehicle, the external sensor assembly comprising:
   a housing comprising a front segment and a raised portion;
   a collection of sensors, comprising:
      one or more first sensors that are forward-facing and aligned with one or more corresponding openings in the front segment of the housing, wherein the one or more first sensors comprise a long range camera, and
      one or more second sensors that are aligned with one or more corresponding openings in the housing, wherein the one or more second sensors comprise a plurality of cameras configured to provide surround vision; and
   at least a LIDAR sensor mounted in the raised portion of the housing.

2. The external sensor assembly of claim 1, further comprising a plurality of lateral sensors, the plurality of lateral sensors being aligned with one or more corresponding openings in one or more lateral segments of the housing, wherein the plurality of lateral sensors are configured to provide surround vision in coordination with the one or more second sensors.

3. The external sensor assembly of claim 1, wherein the one or more first sensors comprise a RADAR sensor.

4. The external sensor assembly of claim 1, wherein the one or more second sensors comprise rear-facing cameras.

5. The external sensor assembly of claim 1, further comprising a sonar unit.

6. The external sensor assembly of claim 1, further comprising:
   multiple wireless transceivers configured to at least receive or transmit wireless data of a respective type.

7. The external sensor assembly of claim 6, further comprising:
   one or more antenna structures integrated with the housing for use with the multiple wireless transceivers.

8. The external sensor assembly of claim 1, wherein the collection of sensors comprises a plurality of stereoscopic cameras.

9. The external sensor assembly of claim 8, wherein the housing comprises openings for at least two cameras of the plurality of stereoscopic cameras which provide a stereoscopic camera pair.

10. The external sensor assembly of claim 1, wherein the collection of sensors comprises at least one designated forward-facing camera positioned to detect a traffic light as the vehicle approaches the traffic light.

11. The external sensor assembly of claim 1, further comprising a mapping sensor provided with an exterior surface of the housing.

12. The external sensor assembly of claim 1, wherein the housing is structured to mount to a roof of an exterior surface of the vehicle.

13. The external sensor assembly of claim 1, wherein the housing is unitary.

14. The external sensor assembly of claim 1, wherein the one or more first sensors are arranged at a first vertical distance from a bottom of the housing, and wherein the one or more second sensors are arranged at a second vertical distance from the bottom of the housing.

15. The external sensor assembly of claim 14, wherein the first vertical distance is higher than the second vertical distance.

16. A vehicle comprising:
an exterior surface; and
an external sensor assembly attached to the exterior surface, the external sensor assembly comprising:
a housing comprising a front segment and a raised portion;
a collection of sensors, comprising:
one or more first sensors that are forward-facing and aligned with one or more corresponding openings in the front segment of the housing, wherein the one or more first sensors comprise a long range camera, and
one or more second sensors that are aligned with one or more corresponding openings in the housing, wherein the one or more second sensors comprise a plurality of cameras configured to provide surround vision; and
at least a LIDAR sensor mounted in the raised portion of the housing.

17. The vehicle of claim 16, wherein the external sensor assembly comprises a plurality of lateral sensors respectively aligned with one or more corresponding openings in one or more lateral segments of the housing, wherein the plurality of lateral sensors are configured to provide surround vision in coordination with the one or more second sensors.

18. An autonomous vehicle, comprising:
an onboard computing system;
an exterior surface; and
an external sensor assembly attached to the exterior surface and in communication with the onboard computing system, the external sensor assembly comprising:
a housing comprising a front segment and a raised portion;
a collection of sensors, comprising:
one or more first sensors that are forward-facing and aligned with one or more corresponding openings in the front segment of the housing, wherein the one or more first sensors comprise a long range camera, and
one or more second sensors that are aligned with one or more corresponding openings in the housing, wherein the one or more second sensors comprise a plurality of cameras configured to provide surround vision; and
at least a LIDAR sensor mounted to the raised portion of the housing.

19. The autonomous vehicle of claim 18, wherein the external sensor assembly comprises a plurality of lateral sensors, the plurality of lateral sensors being aligned with one or more corresponding openings in one or more lateral segments of the housing, wherein the plurality of lateral sensors are configured to provide surround vision in coordination with the one or more second sensors.

20. The autonomous vehicle of claim 18, wherein the one or more first sensors are arranged at a first vertical distance from a bottom of the housing, and wherein the one or more second sensors are arranged at a second vertical distance from the bottom of the housing.

* * * * *